Nov. 9, 1965   E. C. BEAGLE   3,216,344
MACHINE AND METHOD FOR DRYING AND STERILIZING RICE HULLS
Filed May 28, 1963   2 Sheets-Sheet 1

INVENTOR
ELDON C. BEAGLE
BY
Lothrop & West

Nov. 9, 1965   E. C. BEAGLE   3,216,344
MACHINE AND METHOD FOR DRYING AND STERILIZING RICE HULLS
Filed May 28, 1963   2 Sheets-Sheet 2

INVENTOR
ELDON C. BEAGLE
BY Lothrop & West

United States Patent Office 3,216,344
Patented Nov. 9, 1965

3,216,344
MACHINE AND METHOD FOR DRYING AND STERILIZING RICE HULLS
Eldon C. Beagle, 1600 39th St., Sacramento, Calif.
Filed May 28, 1963, Ser. No. 283,909
1 Claim. (Cl. 99—237)

One of the by-products of the rice milling industry is the hull of the rice grain. This hull has a number of uses in commerce and industry and is sometimes used exactly as it is derived from the mill after having been separated from the remainder of the grain. In other instances, the rice hull is utilized in direct connection with food products for human consumption. In its crude form the rice hull is contaminated and is therefore not suited for such purposes, for sanitary and other reasons. While washing in water is effective to remove a large number of the contaminants, the washed hull must be dried and sterilized so as to reduce the count of air-borne bacteria and, particularly, to eliminate the E. coli or botulism-causing bacteria.

It is therefore an object of my invention to provide a method of and device for drying and sterilizing crude rice hulls so that such hulls can subsequently be appropriately and sanitarily utilized for or in connection with foods for human consumption.

Another object of the invention is to provide a rice hull drier and sterilizer effective automatically to process crude rice hulls in such a way that they are dry and sterile when completed and in such a way that large quantities of rice hulls can be appropriately and effectively handled without substantial cost and, of course, without human handling.

Another object of the invention is to provide a method of drying and sterilizing rice hulls effective to remove accompaniments detrimental to use with foods for human consumption.

Another object of the invention is in general to beneficiate crude rice hulls so as to increase their market value and increase their general range of utility.

Another object of the invention is to provide an effective manner and means for providing dry, sterilized rice hulls.

While the invention can be embodied in a number of different mechanical forms and the method can be practiced by various different steps, the embodiment and process disclosed herein have been highly successful. The mechanism and method preferably utilized are described in the accompanying description and the preferred machine is illustrated in the accompanying drawings in which.

Figure 1:
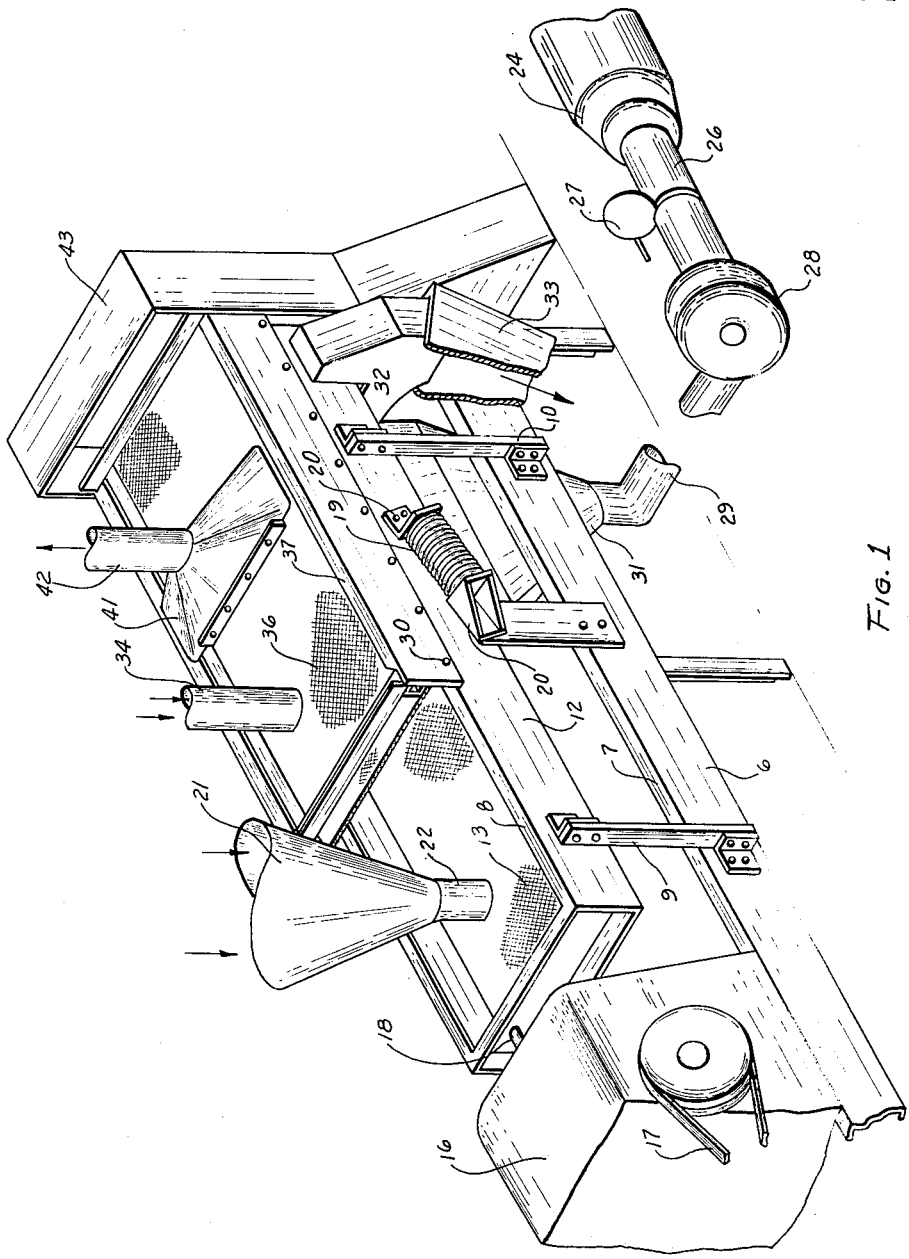
FIGURE 1 is an isometric perspective of a rice hull drier and sterilizer with certain portions broken away to reduce the size of the figure and other portions being shown semi-diagrammatically.
Figure 2:
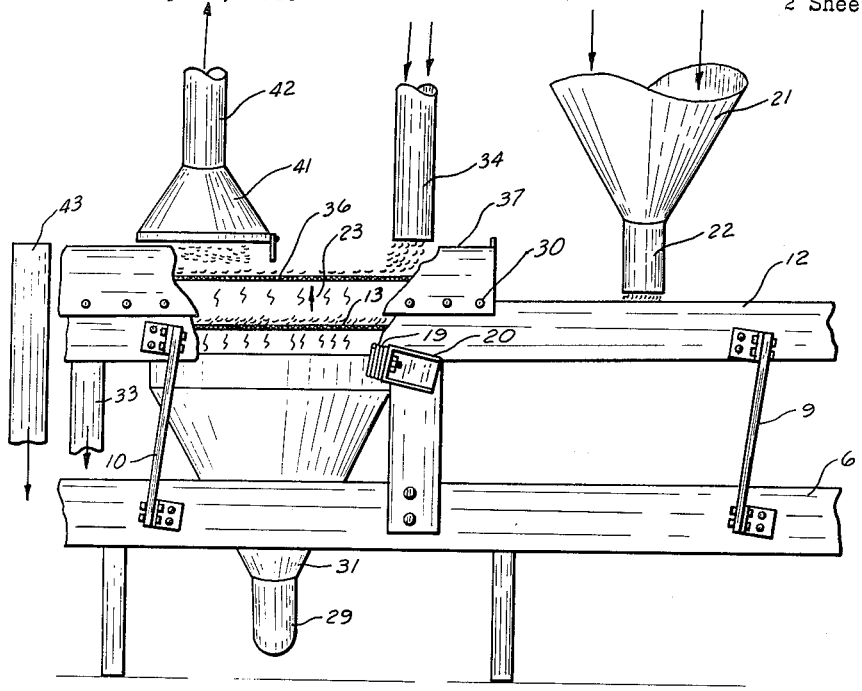
FIGURE 2 is a side elevation of a portion of the mechanism illustrated in FIGURE 1 with parts broken away to reduce the size of the figure and with certain portions of the framing being removed ot disclose interior constructions.
Figure 3:
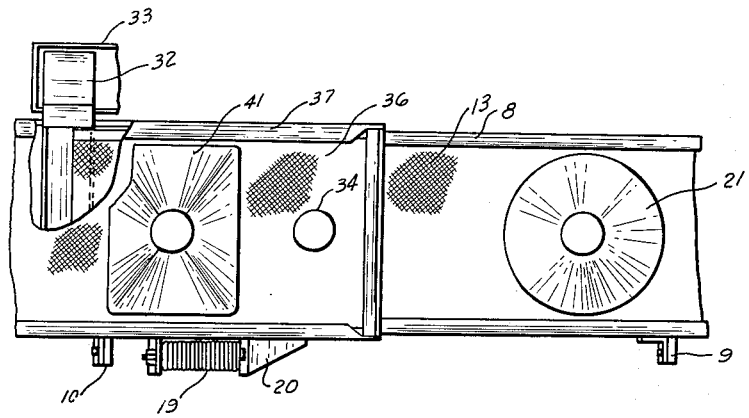
FIGURE 3 is a plan to a smaller scale of much of the mechanism shown in FIGURE 2.

In the preferred manner of embodying the device of the invention and of carrying out the method, there is provided at a convenient location a frame 6 made up of the customary metal shapes such as channels and angles and including a pair of parallel frame rails 7 supported at a convenient distance from the ground and serving as mountings for a plurality of pairs of upstanding flexible straps 9 and 10 individually located on each side of the structure. Secured to the upper ends of the upstanding flexible strap pairs is a subframe 12 rectangular in plan and including a pair of parallel frame rails 8, the subframe 12 being included in the structure of a primary screen device. The frame 12 is supported on the pairs of uprights 9 and 10 at a slight inclination to the horizontal so that the end attached to the uprights 9 is slightly higher than the portion attached to the uprights 10. The inclination of the screen is relatively small so that it can properly be referred to as nearly or substantially horizontal. The interior space defined by the subframe 12 is covered on its bottom with a foraminous or reticulated member 13, conveniently hardware cloth, of a relatively coarse mesh designed to permit the retention of the major portion of the rice hulls of a size and form normally encountered but to permit undesirable foreign materials, such as chaff, to drop through the reticulated or screen-like member.

The subframe or primary screen frame 12, being flexibly mounted, is designed to be horizontally oscillated in the general direction of its length. For that reason there is mounted on the frame 6 a vibrating driver 16 propelled through a belt mechanism 17 from any appropriate source of power (not shown) and having a connection 18 to the subframe 12. Springs 19 between brackets 20 on the main and subframes work with the driver 16. When power is appropriately applied to the oscillating driver 16, the subframe 12 and the screen 13 are vibrated.

Crude rice hulls, usually somewhat damp and with a certain amount of entrained deleterious matter, are brought from an appropriate hull washing and screening location and are deposited in a feed hopper 21. The hulls to be treated are released at an appropriate rate through a conduit 22 disposed at the bottom of the feed device 21 and terminating slightly above the subframe 12 so as to fall or slump by gravity onto the oscillating or shaking screen 13. The rice hulls which are so deposited adjacent one end of the screen 13 are correspondingly agitated and tumbled thereby so that any otherwise adherent or entrained foreign matter is shaken loose and falls by gravity through the screen and into a receptacle (not shown) or beneath the main frame 6. The moist rice hulls are thus initially cleaned of dirt, chaff and grossly excess moisture.

Because of the slight inclination to the horizontal of the primary screen 13, the shaking rice hulls gradually are traversed from the loading end of the screen 13 toward the opposite end thereof. As the initially cleaned and agitated rice hulls are advanced over the primary screen 13 and as they travel toward the other end thereof, they pass through the upwardly directed path 23 of a hot blast of drying and sterilizing gas. In most commercial installations an appropriate gas for this purpose is highly heated atmospheric air derived from a furnace 24 at an elevated temperature such that the hulls are subjected to a temperature of the order of 350°–450° F. While dry rice hulls would tend to char at this temperature, the moist hulls can withstand the excessive temperature for a brief period without charring or other bad effects.

Hot air for the blast is drawn from the furnace 24 through a duct 26, and under control of a damper 27, by a centrifugal draft fan 28 propelled in the customary way by a motor (not shown). The hot air discharged by the blower 28 is carried by a conduit 29 into an expansion duct 31 fitted onto an appropriate, restricted part of the main frame 6 and terminating just below the lower surface of the primary screen 13. In this way a draft of relatively hot, drying and sterilizing air is reduced in velocity as it traverses the expanding member 31 and discharges with approximately uniform blast velocity in an upward direction over a large part of the remote end of the primary screen 13. The upwardly directed blast traverses the horizontally advancing rice hulls which are tumbled on the vibrating screen 13. The hulls are thus uniformly and completely subjected to the drying and sterilizing air blast and are themselves briefly heated superficially in a superficial fashion to eliminate unwanted adhering and entrained materials so that the hulls are, to a degree, effectively dried and externally sterilized.

The preliminarily sterilized and relatively dry rice hulls continuing to advance toward the opposite end of the primary screen 13 are discharged over the remote end thereof into a transverse inclined trunk 32. The discharged hulls travel by gravity to a conveyor 33 which elevates the rice hulls to a point from which they can fall by gravity through a secondary feed conduit 34. This extends to a location just above the upper surface of an inclined secondary screen 36.

The secondary screen 36 is appropriately mounted within a secondary frame 37 parallel to and secured by removable fastenings 30 to the subframe 12 and so partakes of the same vibratory movement as the screen frame 12. The screen 36 is of a finer mesh than the initial or primary screen 13 and is of a shorter length so as to leave unencumbered the initial portion of the primary screen 13. The partly treated rice hulls, discharged by gravity onto the leading end of the secondary screen 36, advance toward the other end thereof because of the slight inclination to the horizontal of such screen. As they advance, the partly treated rice hulls traverse the continuing upward path of the blast of hot sterile air that has already traversed the rice hulls on the primary screen 13. Thus a second heat treatment of the rice hulls occurs by reason of the sterilizing gas. The second step of treatment, however, is with a gas at a somewhat lower temperature since some heat has been lost during the primary treatment. The temperature is low enough so that the rice hulls are not charred even though they are nearly or entirely dry. As they travel through the blast of sterilizing air traversing the secondary screen 36, the rice hulls again are agitated and elevated substantially in temperature so that they are further treated to dry any moisture and to preclude any nonsterile material.

Separately depending over the secondary screen 36 in the vicinity of the terminal portion of the blast area and at a point away from the secondary discharge conduit 34 is an uptake hood 41 connected to a duct 42 leading to a vacuum fan or other source of subatmospheric pressure.

The duct 42 is effective to carry away ambient dust, any remaining chaff, and the exhaust materials from the hot blast. In many instances the duct 42 discharges directly to the atmosphere, although a heat exchanger can be utilized, if desired, to recover some of the drying and sterilizing heat. The doubly treated rice hulls continue along the secondary screen 36 and discharge over the remote end thereof into a receiver 43 through which they fall by gravity into bulk containers or packaging machinery (not shown).

It will be appreciated that although crude, moist, rice hulls are fed into the drier and sterilizer, the operation of the mechanism not only shakes off the readily discharged adherent material, but also subjects the hulls thereafter to a double heat treatment at temperatures elevated sufficiently to dry the hulls and to destroy bacteria and other unwanted adherents to the rice hulls and finally discharges such hulls in their dry, sterilized condition for packaging and further handling, all without the intervention of human hands and in an automatic fashion.

It will be further appreciated that the method of the invention includes subjecting the crude rice hulls first to a washing and screening operation followed by a step for removing any readily adherent materials and then subjecting the rice hulls to a relatively elevated drying but non-charring sterilizing temperature accompanied by agitation or tumbling of the hulls. Following this the hulls are permitted to cool momentarily to a relatively low temperature following which they are again agitated and subjected to a moderately high temperature for further final drying sterilization during agitation. After this the process is considered finished and has been effective to produce economically and effectively a bulk supply of sterilized rice hulls.

What is claimed is:

A rice hull sterilizer comprising a frame, a primary substantially horizontal screen mounted for oscillation on said frame, means on said frame for oscillating said primary screen, means for supplying rice hulls to said primary screen adjacent one end thereof for traverse toward the other end of said primary screen, means for discharging a blast of sterilizing air upwardly through said primary screen adjacent said other end thereof, a secondary substantially horizontal screen secured to and overlying a part only of said primary screen in the path of said blast, means for conveying rice hulls discharged from said other end of said primary screen to one end of said secondary screen for traverse toward the other end of said secondary screen, and means for removing rice hulls from said secondary screen at a location on the other side of said blast path from said one end of said secondary screen.

References Cited by the Examiner

UNITED STATES PATENTS

| | | | |
|---|---|---|---|
| 1,074,977 | 10/13 | Provost | 99—237 |
| 1,107,028 | 8/14 | Busch | 34—164 X |
| 1,225,403 | 5/17 | Borislavsky | 34—164 X |
| 2,094,786 | 10/37 | Flint | 34—164 |
| 2,381,421 | 8/45 | Balls et al. | 99—153 |
| 2,544,616 | 3/51 | Sartorius | 34—164 X |
| 2,563,798 | 8/51 | Burns et al. | 99—153 |
| 3,006,269 | 10/61 | Bardet et al. | 99—237 |
| 3,063,848 | 11/62 | Van Gelder | 99—199 X |

ROBERT E. PULFREY, *Primary Examiner.*

RAYMOND N. JONES, *Examiner.*